US007238396B2

(12) United States Patent
Rieck

(10) Patent No.: US 7,238,396 B2
(45) **Date of Patent: *Jul. 3, 2007**

(54) METHODS FOR VITRESCENT MARKING

(76) Inventor: Albert S. Rieck, 6985 Garden Rd., West Palm Beach, FL (US) 33404

(*) Notice: Subject to any disclaimer, the term of this patent is extended or adjusted under 35 U.S.C. 154(b) by 478 days.

This patent is subject to a terminal disclaimer.

(21) Appl. No.: 10/638,136

(22) Filed: Aug. 8, 2003

(65) Prior Publication Data

US 2004/0197490 A1 Oct. 7, 2004

Related U.S. Application Data

(63) Continuation-in-part of application No. 10/211,956, filed on Aug. 2, 2002, now Pat. No. 6,635,846.

(51) Int. Cl.
*B05D 3/06* (2006.01)
*B05D 3/04* (2006.01)
*B05D 5/00* (2006.01)
*B23K 26/00* (2006.01)

(52) U.S. Cl. ...................... 427/555; 427/559; 427/557; 219/121.66; 219/121.64

(58) Field of Classification Search ................ 427/554, 427/555, 557, 558, 559, 596, 279, 193, 374.4, 427/376.2, 419.4, 419.6
See application file for complete search history.

(56) References Cited

U.S. PATENT DOCUMENTS 3,945,318 A 3/1976 Landsman
3,962,513 A 6/1976 Eames
4,306,012 A 12/1981 Scheve
4,327,283 A 4/1982 Heyman et al.
4,515,867 A 5/1985 Bleacher et al.
4,522,847 A * 6/1985 Cornet et al. ............... 427/557
4,541,340 A 9/1985 Peart et al.
4,651,313 A 3/1987 Guez
4,769,310 A 9/1988 Gugger et al.
4,814,575 A 3/1989 Petitbon
4,847,181 A 7/1989 Shimokawa (Continued)

FOREIGN PATENT DOCUMENTS

DE 201136 7/1983

(Continued)

OTHER PUBLICATIONS

Maurer, Norbert, et al., "High Speed Laser Marketing, Pen-type Nd: YAG Systems" pp. 1-4, no date.

(Continued)

*Primary Examiner*—Marianne Padgett
(74) *Attorney, Agent, or Firm*—Polster, Lieder, Woodruff & Lucchesi, L.C.

(57) ABSTRACT

Methods for vitrescent marking of substrates, likes bricks, are described that include placing the substrate to be marked and at least one marking material in reactive contact with each other and vitrifying the substrate and the marking material to form a marking below the outer surface of the substrate. The vitrification may be accomplished by irradiating the marking material and the substrate with a radiant energy beam that has a wavelength and an energy level sufficient to vitrify the marking material and the substrate for form a vitrescent marking that is below the outer surface of the substrate.

38 Claims, 2 Drawing Sheets

U.S. PATENT DOCUMENTS

| | | | |
|---|---|---|---|
| 4,854,957 A | 8/1989 | Borrelli et al. | |
| 4,856,670 A | 8/1989 | Hang et al. | |
| 4,861,620 A | 8/1989 | Azuma et al. | |
| 4,912,298 A | 3/1990 | Daniels et al. | |
| 5,030,551 A | 7/1991 | Herren et al. | |
| 5,035,983 A | 7/1991 | Kiyonari et al. | |
| 5,061,341 A | 10/1991 | Kildal et al. | |
| 5,063,137 A | 11/1991 | Kiyonari et al. | |
| 5,075,195 A | 12/1991 | Babler et al. | |
| 5,116,674 A | 5/1992 | Schmidhalter et al. | |
| 5,175,425 A | 12/1992 | Spratte et al. | |
| 5,215,864 A | 6/1993 | Laakmann | |
| 5,359,176 A | 10/1994 | Balliet, Jr. et al. | |
| 5,397,686 A | 3/1995 | Dominick et al. | |
| 5,409,742 A * | 4/1995 | Arfsten et al. | 427/555 |
| 5,422,146 A | 6/1995 | Adams | |
| 5,427,825 A * | 6/1995 | Murnick | 427/555 |
| 5,523,125 A | 6/1996 | Kennedy et al. | |
| 5,538,764 A | 7/1996 | Li et al. | |
| 5,543,269 A | 8/1996 | Chatterjee et al. | |
| 5,554,335 A * | 9/1996 | Fields et al. | 264/400 |
| 5,609,778 A | 3/1997 | Pulaski et al. | |
| 5,637,244 A | 6/1997 | Erokhin | |
| 5,673,532 A | 10/1997 | Jennings et al. | |
| 5,719,372 A | 2/1998 | Togari et al. | |
| 5,734,412 A | 3/1998 | Hasebe et al. | |
| 5,740,941 A | 4/1998 | Lemelson | |
| 5,760,367 A | 6/1998 | Rosenwasser et al. | |
| 5,761,111 A | 6/1998 | Glezer | |
| 5,767,483 A | 6/1998 | Cameron et al. | |
| 5,801,356 A | 9/1998 | Richman | |
| 5,804,342 A | 9/1998 | Paz-Pujalt et al. | |
| 5,851,335 A * | 12/1998 | Budnik et al. | 156/257 |
| 5,866,644 A | 2/1999 | Mercx et al. | |
| 5,985,078 A | 11/1999 | Suess et al. | |
| 5,985,377 A * | 11/1999 | Corbett | 427/511 |
| 6,064,034 A * | 5/2000 | Rieck | 219/121.85 |
| 6,075,223 A | 6/2000 | Harrison | |
| 6,238,847 B1 * | 5/2001 | Axtell et al. | 430/322 |
| 6,313,436 B1 * | 11/2001 | Harrison | 219/121.85 |
| 6,372,819 B1 | 4/2002 | Mizobuchi et al. | |
| 6,593,543 B2 * | 7/2003 | Benderly | 219/121.68 |
| 6,635,846 B1 * | 10/2003 | Rieck | 219/121.69 |
| 6,852,948 B1 | 2/2005 | Harrison | |
| 2003/0012891 A1 * | 1/2003 | Hory et al. | 427/596 |
| 2006/0219676 A1 * | 10/2006 | Taylor et al. | 219/121.69 |

FOREIGN PATENT DOCUMENTS

| | | |
|---|---|---|
| DE | 215776 | 11/1984 |
| DE | 3539047 | 7/1986 |
| DE | 3738330 | 5/1988 |
| DE | 4212429 | 10/1993 |
| EP | 0419377 | 9/1990 |
| EP | 531584 | 3/1993 |
| EP | 0637517 | 8/1994 |
| EP | 0716135 | 6/1996 |
| EP | 0761377 | 3/1997 |
| EP | 0782933 | 7/1997 |
| FR | 2772021 | 11/1999 |
| GB | 2227570 | 1/1990 |
| JP | 62223940 | 10/1987 |
| JP | 63216790 | 9/1988 |
| JP | 1194235 | 8/1989 |
| JP | 1222994 | 9/1989 |
| JP | 1222995 | 9/1989 |
| JP | 2165001 | 6/1990 |
| JP | 3250031 | 11/1991 |
| JP | 4198366 | 7/1992 |
| JP | 5138114 | 6/1993 |
| JP | 6106378 | 4/1994 |
| JP | 760464 | 3/1995 |
| JP | 7237350 | 9/1995 |
| JP | 7266695 | 10/1995 |
| JP | 831682 | 2/1996 |
| WO | 9513195 | 5/1995 |
| WO | 9535269 | 12/1995 |
| WO | 9632221 | 10/1996 |
| WO | 9916625 | 4/1999 |
| WO | 9929519 | 6/1999 |
| WO | 9942421 | 8/1999 |

OTHER PUBLICATIONS

"Laser Marking: Design and Process Fundamentals," Online Laser Technology Library, no date.

"Evaluating Bean-Steered Laser Marking Technology," Online Laser Technology Library, no date.

"Evaluation Guide to Nd: YAG Laser Marking Systems," Online Laser Technology Library, no date.

"Applications Development for Beam-steered Nd:YAG Laser Marking," Online Laser Technology Library no date.

"Laser Marking in the Automotive Industry," Online Laser Technology Library, no date.

"Implementation of Bean-Steered Laser Marking of Coated and Uncoated Plastics" Online Laser Technology Library no date.

Hahn, Karlheinz, et al., "Firing PbO-free glass enamels using the cs-$CO_2$ laser," received Nov. 11, 1995.

* cited by examiner

METHODS FOR VITRESCENT MARKING

CROSS-REFERENCE TO RELATED APPLICATIONS

This application is a continuation-in-part of U.S. patent application Ser. No. 10/211,956, filed on Aug. 2, 2002 now U.S. Pat. No. 6,635,846.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

This invention relates the field of marking materials using lasers. More specifically, this invention relates to the field of marking materials using laser vitrification techniques.

The widespread usage of bricks as building materials on highly visible areas such as walkways and building fronts has led artisans to attempt to decorate or mark bricks with letters or graphical patterns. As such, the laser marking of brick, pavers, terra-cotta tiles, and other high clay content materials is known in the art.

Currently, surface coating techniques utilize marking mediums, which include either a glass frit containing an energy absorbing enhancer, or a mixed metal oxide or a mixed organic pigment. Using current methods, the marking medium is placed in physical contact with the brick, or other substrate, and the medium is irradiated using a low-energy laser. The irradiation causes the marking material to solidify, and a raised, marking layer is formed on the top surface of the substrate. The non-irradiated portion of the marking material is then removed from the substrate.

Using surface-marking methods, the substrate is not damaged. A raised marking layer is formed on the surface of the substrate. This raised marking layer is thereby subject to damage from cracking due to wear, impacts, thermal stresses and the like.

Therefore, a permanent marking technique is needed that produces a marking that is not susceptible to damage from cracking due to wear, impacts, thermal stresses and the like.

SUMMARY OF THE INVENTION

In one aspect, a method for vitrescent marking of a substrate is provided that comprises placing the substrate to be marked and at least one marking material in reactive contact with each other, wherein the substrate has an outer surface, and vitrifying the substrate and the marking material to form a vitrescent marking below the outer surface of the substrate, wherein the vitrification comprises irradiating the marking material and the substrate with a radiant energy beam, wherein the radiant energy beam has a wavelength and energy level sufficient to vitrify the at least one marking material and the substrate to form a vitrescent marking below the outer surface of the substrate;

In another aspect, a method for vitrescent marking of a substrate is provided that comprises placing a substrate and at least one marking material in reactive contact with each other, wherein the substrate has an outer surface, and irradiating the marking material and the substrate with a continuous wave laser beam having an energy level ranging between about 60 watts and about 100 watts, wherein the laser beam has a wavelength of about 1064 nanometers and is adapted to vitrify the at least one marking material and the substrate to form a vitrescent marking between about one sixty-forth of an inch and about one-eighth of an inch below the outer surface of the substrate;

In yet another aspect of the invention, a method for vitrescent marking of a substrate is provided that comprises placing at least one marking material onto an outer surface of a brick and vitrifying the brick and the marking material to form a vitrescent marking below the surface of the brick, wherein the vitrification comprises irradiating the at least one marking material and the brick with a laser beam, wherein said vitrescent marking produced is at a depth between about one sixty-fourth of an inch and about one-eighth of an inch below the outer surface of the brick, wherein the laser beam has a wavelength of about 1064 nanometers, wherein the laser beam has a beam width expansion factor of about 1.6× to about 5.0×, wherein the laser beam irradiates the substrate and the marking material with a continuous wave, and wherein the laser beam has an energy level ranging between about 60 watts and about 80 watts.

DETAILED DESCRIPTION

Figure 1:
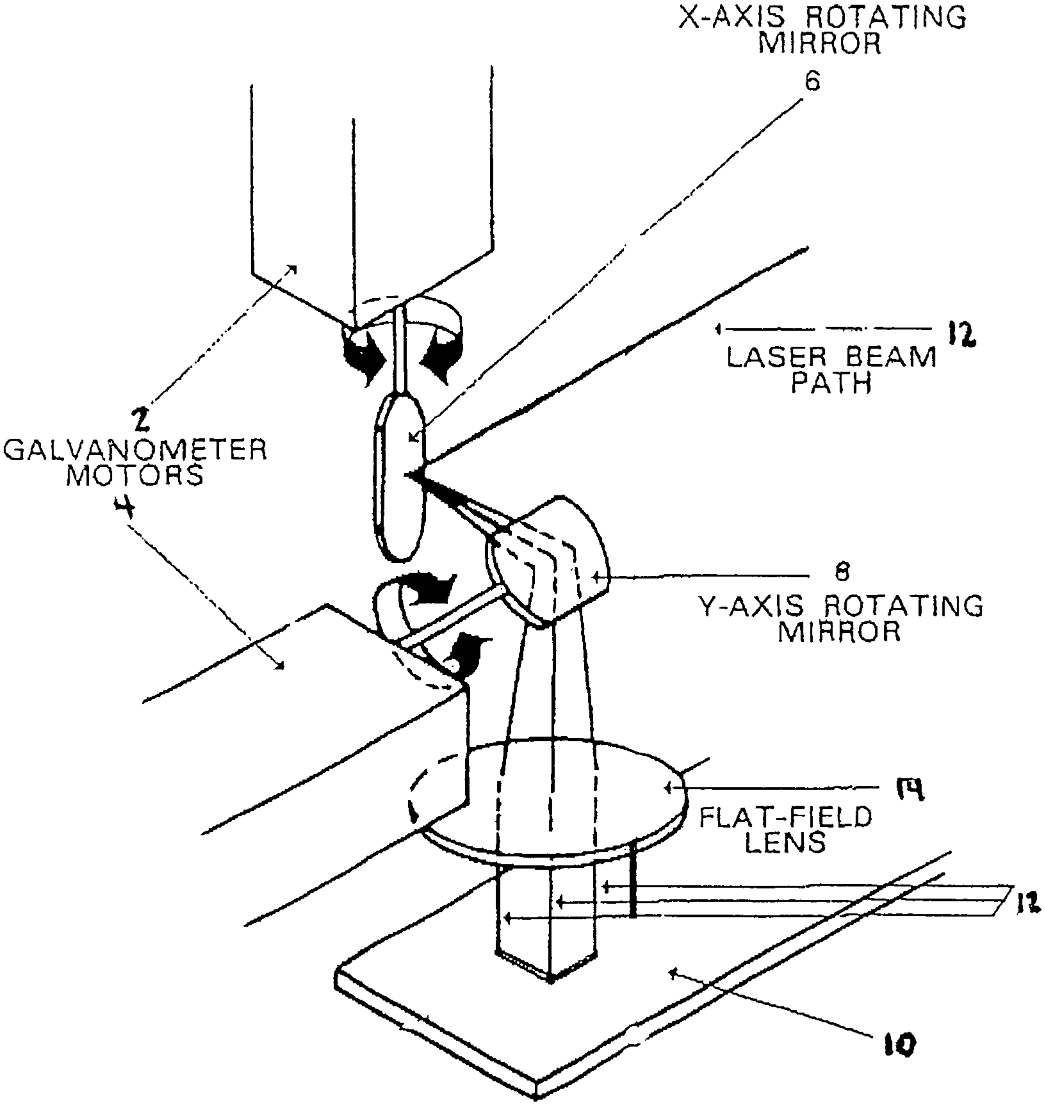
FIG. 1 illustrates a method of permanent vitrescent marking of a surface in accordance with the methods of the invention.

New and useful methods for permanent vitrescent marking of a substrate have been discovered that include placing the substrate and at least one marking material in reactive contact with each other, and vitrifying the substrate and the marking material to form a vitrescent marking 38 below the surface 32 of the substrate FIG. 2. According to the methods of the invention, and with reference to FIG. 1, the marking material and the substrate are irradiated with a radiant energy beam having a wavelength and energy level adapted to vitrify both the marking material and the substrate to form a vitrescent marking below the surface of the substrate. In opposite to current marking methods that apply the marking material to the surface of the substrate, the inventive methods described herein act to produce a mark below the surface of the substrate. The radiant energy beam is used to vitrify the marking material and the substrate by applying heat and energy thereon, thereby fusing them together to form a glass below the surface of the substrate. As such, the radiant energy beam utilized has a wavelength adapted to vitrify the marking material and the substrate below the surface of the substrate. The vitrified surface area, inclusive of the colorant, is integrally formed into the surrounding material of the substrate and cannot be readily worn off. While the lettering or graphical patterns are very visible, very little channeling occurs in the substrate, and the pattern colors are a natural result of the glassification process. The vitrification process is more resistant to freezing and abrasion, as well.

The glass formed is permanent, and lies below the surface of the substrate. As such, the substrate must be adapted such that some vitrification is possible. Unlike the prior art methods, however, the substrate need not have a material content that allows for complete glassification of an image during vitrification. Rather, the substrate need only have sufficient material content to allow for partial vitrification wherein the vitrified portion remains below the surface of the substrate. Having a vitrescent marking below the surface of the substrate reduces subsequent wear and tear on the marking and prevents debris and other contamination from affecting the appearance of the marked substrate. As used herein, the term "vitrify" refers to the act of converting materials into a glass or glassy substance by heat and/or fusion. Accordingly, the term "vitrification," as used herein, refers to the process of converting materials into glass or glassy substances using heat and/or fusion.

According to the methods of the invention, at least one marking material and a substrate to be marked are placed in reactive contact with each other prior to vitrification. As used herein, the phrase "reactive contact" means contact sufficient to allow vitrification to take place. As such, it is not critical that the substrate and the marking material be in physical contact with each other, or that the marking material be applied directly onto the surface of the substrate. The substrate and marking material may be adjacent to, in partial physical contact with, or within a sufficient distance from each other such that the marking material and the substrate can be melted and fused together by the radiant energy beam. The marking material may be in various forms, including but not limited to powder, paste and sheet forms. The marking material may also be pre-applied to a carrier prior to vitrification. The amount of marking material employed varies. Generally, however the marking material is applied at a thickness of about 0.0005 inch to about 0.100 inch thick. The materials may be brought into reactive contact with each other by any known method, including, but not limited to direct application, brushing and dipping. The materials may be mixed in various media, including, but not limited to water, mineral oil, glycerin, other solvents or sol gels. The materials may be in sheet form, or incorporated into a tape or decal. The materials may also be brought into contact with each other by methods including, but not limited to silk screen printing, pad printing, gravure printing, gravity feed, centrifugal force, roll coating, spraying, brush, dipping, and flow coating.

The substrate may be any material for which marking is desired. In one embodiment, the substrate is a brick. A typical brick suited for use in the methods of the invention may comprise a varied mixture of clay, sand and grog. Grog is broken up pieces of brick placed back into the mix to manufacture new bricks. The general contents of a brick, however, will vary by lot and color. No specific brick from any particular manufacturer has been found to be more preferable over any other. However, the different bricks are susceptible to vitrification in varying degrees depending upon such factors as the clay, sand and grog content, and overall color. In another embodiment, the substrate is a ceramic. In yet another embodiment, the substrate comprises cement. In a further embodiment, the substrate is concrete or stone.

The marking material employed may comprise a glass frit material such as lead or lead-free frit, precursors of glass frit materials, metal oxides, mixed metal oxides, or combinations or mixtures thereof. As used herein, the term "glass frit" means pre-fused glass material, which is typically produced by rapid solidification of molten material followed by grinding or milling to the desired powder size. Glass frit is generally composed of alkali metal oxides, alkaline earth metal oxides, silica, boric oxide and transition metal oxides. Examples of glass frit materials include, but are not limited to metal oxides and glass formers, such as silica, zinc oxide, bismuth oxide, sodium borate, sodium carbonate, feldspars, fluorides and the like. Finely ground glass substrate materials are also suitable marking materials, as well as inorganic pigments and precursors thereof. Metal powders such as iron, copper, nickel, silver, chromium and the like may be used, as well as organometallic materials of various metals. Examples of suitable marking materials also include silver sulfide, copper, copper oxide, barium sulfate, iron sulfide, calcium hydroxide and crystalline silica, silver sulfide, copper oxide, copper-iron sulfide and kaolin clay, barium sulfate, iron sulfate, iron oxide, lead borosilicate cobalt compounds, iron oxide chromium compounds, nickel, manganese and chromium compounds and iron oxides. Further examples of inorganic marking materials suitable for use in the present invention include zirconium silicate, zirconium oxide or tin oxide, the crystal lattice of which contains ions of transition metals or rare earth metals, as e.g., in zirconium vanadium blue, in zirconium preseodyme yellow and in zirconium iron pink, or the cadmium sulfides and cadmium sulfoselenides, as well as inclusion pigments containing such compounds. In specific embodiments of the invention, zirconium vanadium yellow, preseodyme yellow, titanium dioxide, titanates, cadmium sulfides and cadmium sulfoselenides, as well as inclusion pigments containing such compounds, are employed.

Typical ceramic colorants that are suitable for use in the marking material of the invention include, but are not limited to cobalt aluminates, chrome tin pink sphere, chrome tin orchid cassitorite, zirconium preseodyme yellow, zirconium iron pink, tin vanadium yellow, cadmium sulfoselenides, cadmium sulfides, and the inclusion compounds containing them, such as zirconium silicate, tin oxide, zirconium oxide or quartz, copper-red, manganese pink, colcothar, the iron oxide brown pigments such as iron oxides, iron-chrome-alumina spinels, manganese-alumina spinels, wine-chrome spinels, iron-alumina spinels, zinc-iron spinels, nickel-iron spinels, manganese-chrome spinels, zinc-iron-chrome spinels, tin oxide, titanium dioxide and titanates, such as nickel-antimony titanate, chrome-antimony titanate and manganese-antimony titanate.

The glass substance produced via vitrification can vary in color depending upon the color and type of brick, or other substrate, and the marking material employed. For instance, a reddish brick is found to produce a darker vitrescent marking. Lighter shades of bricks, including for instance gray and ivory, have been shown to produce more of a greenish vitrescent marking. In each case, the vitrified patterns are easily visible below the surface of the brick. Changing the laser type configuration and power might also change the appearance of the vitrification area and its appearance.

In various embodiments of the invention, additional marking enhancement agents are placed in reactive contact with the marking material and the substrate prior to, or after, vitrification. Some marking enhancement agents include, but are not limited to, porcelain enamel mixtures. These mixtures may include, but are not limited to oxides of chromium, cobalt, aluminum and manganese, fluoride containing compounds, soluble molybdenum compounds, crystalline silica, copper, nickel and zirconium compound, spinels, for example cobalt chromite blue-green spinel ($Co(Al, Cr)_2O_4$), chrome iron nickel black spinel ($(Ni, Fe)(Cr, Fe)_2O_4$: MnO), and pigments such as nickel antimony titanium yellow rutile $(Ti,Ni,Sb)O_2$.

The marking materials of the invention may be used alone, or in combination. For example, a combination of metal oxides with glass frit, metal oxides with metal sulfides, or inorganic pigments with glass frits may be used.

A radiant energy beam is used to vitrify the marking material and the substrate to form a vitrescent marking below the surface of the substrate. According to the methods of the invention, the radiant energy beam heats specific areas of the surface of the substrate to vitrify, or glassify, the marking material and the substrate. Any radiant energy beam having a wavelength adapted to vitrify the marking material and the substrate to form a vitrescent marking below the surface of the substrate may be employed.

In a specific embodiment of the invention, a carrier is employed to introduce the marking material to the substrate. The marking material may be introduced to the carrier by any known method of accomplishing such. The marking material may be introduced to the carrier using any of the methods described herein for introducing the marking material and the substrate together. Some examples of methods of introducing the carrier to the marking material include, but are not limited to pad printing, silk screening and gravure.

Any carrier may be employed so long as the carrier is capable of carrying the marking material and allows the marking materials and the substrate to fuse during vitrification. In a more specific embodiment, the carrier is non-metallic. In another more specific embodiment, the carrier is formed from a clean metal-based foil wherein pigment colorants are added to react with the metal oxide formed during vitrification. Examples of suitable metal-based carriers, include, but are not limited to nickel, brass, aluminum and the like that are capable of being placed into a foil. Such carriers, upon absorption of laser energy, generally form reactive oxides. In one embodiment, aluminum foil is employed as a carrier. A commercially available aluminum foil that is suitable for use in the methods of the invention is manufactured by All-Foils, Inc., and has a gauge between 0.00025 inch and 0.0059 inch.

In one embodiment, the radiant energy beam is a laser beam. The laser beam can be made steerable via computer controlled steering mirrors, and can also be guided manually. Programs may then be utilized to steer the beam in the shape of letters or graphical characters across the face of the substrate. The programs are written so that different methods of tracing letters or graphical patterns will optimize the laser beam width and intensity. The markings may also be produced by manually guiding the radiant energy beam, or laser beam.

Any laser beam having a wavelength and energy level adapted to vitrify the marking material and the substrate to form a vitrescent marking below the surface of the substrate may be employed. Generally, a high-powered laser is employed so that the marking material and the substrate are melted and fused below the surface of the substrate. In one embodiment, an Nd:Yag laser with a wavelength of 1064 nanometers is employed that utilizes a continuous wave beam that has an energy level ranging between about 40 W and 250 W. A continuous wave beam is preferable because it provides sufficient power to quickly mark the surface of the substrate. The continuous wave beam is also preferable because it produces a smoother mark due to its non-pulsing action upon the surface of the substrate. In another embodiment, an Nd:Yag laser with a wavelength of about 1064 nanometers is employed that utilizes a continuous wave beam having an energy level ranging between about 60 W and about 100 W. In yet another embodiment, an Nd:Yag laser with a wavelength of 1064 nanometers is employed that utilizes a continuous wave beam having an energy level ranging between about 60 watts and about 80 watts.

Generally, and in one embodiment of the invention, the Nd:Yag laser is equipped with a 10-inch or larger objective lens and a beam telescope or collimator. The collimator or beam expander, such as those available from Rodenstock Precision Optics, Inc., expands the beam in a range of 2×-8× that of the original beam width emanating from the laser. Modification of the standard collimator so as to produce a beam that is expanded by a factor of about 1.6× to about 5.0× wide will unexpectedly improve the resultant intensity of the laser beam, thereby resulting in more efficient marking of objects, particularly in a mass production situation. In a specific embodiment, a beam width expansion factor in the range of 1.6×-5.0× is utilized with a 254 mm objective lens. In a more specific embodiment, a beam width expansion factor of 3.0× is utilized.

In certain embodiments, a Q-switch is incorporated inside the Nd:Yag laser to cause a delay between laser pulses. This allows the power of the emitted beam to build up to a greater power density between each pulse. It is contemplated, however, that other lasers could be used, including a $CO_2$ laser, which operates at a continuous wavelength of 10,640 nanometers and a variety of energy levels.

Figure 2:
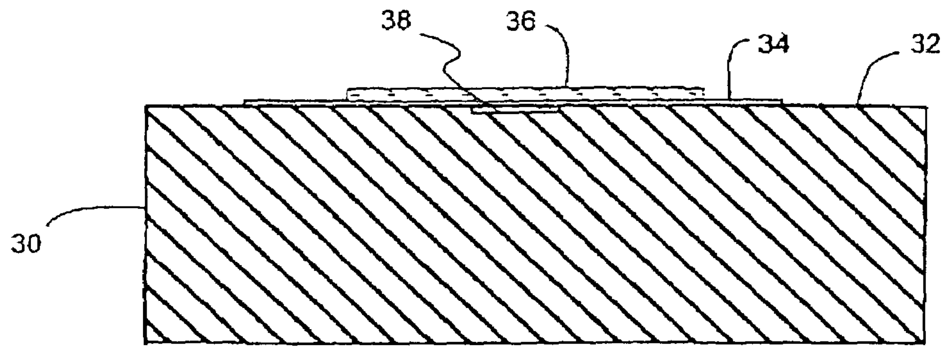
FIG. 2 is an illustration of the colorant carrier in an open-faced package.

In the specific embodiment of the invention illustrated in FIG. 1, one galvanometer motor 2 is connected to an X-axis rotating mirror 6, and another galvanometer motor 4 is connected to a Y-axis rotating mirror 8. Each mirror 6, 8 is used in conjunction with the other and the laser is fitted with a flat-field lens 14. A laser beam 12 is directed, using a computer-controlled device, in a pattern across the surface of the substrate 10. Upon contact of the laser beam 12 with the substrate 10, a portion of the substrate 10 vitrifies, or turns to glass. The irradiation may take place at any rate. In one embodiment, the irradiation takes place at a rate of about 10 to about 500 millimeters ("mm") per second. In another embodiment, the irradiation takes place at a rate of about 50 mm per second. The irradiation may take place repeated times to achieve the desired vitrification depth and overall appearance. The laser may make one pass over the desired image, or multiple passes depending on the specific marking material and substrate employed, as well as the desired marking.

The substrates of the invention may be irradiated in accordance with the methods of the invention with little or no pre-treatment. However, it has been found that in order to achieve optimum vitrification, some substrates, such as bricks, must be almost completely dry prior to vitrification. When moisture is present, the laser energy necessary for vitrification is lost converting water to steam. As the steam escapes through the molten glass, it causes bubbles to form. Moisture also takes heat away from the surface causing poor penetration of the beam and resulting in very poor marking qualities. Drying optimizes the glass formation so as to produce a very smooth and glassy appearance of the marked area.

The average moisture content of a high quality clay brick paver as received from commercial sources is approximately 2 to 8 percent, by weight. This moisture can be acquired from rain, snow, condensation, factory applied water based sealants, as well as from other sources. Moisture content must be reduced to about 0.75 percent or less to achieve optimum laser vitrification. When a brick is dry, most of the laser energy will be able to be used to vitrify the clay surface to glass and the remainder into heating the clay body.

Accordingly, in a specific embodiment of the invention, the substrate is dried and/or warmed to a temperature of 100°

F. or more prior to irradiation. Drying can be accomplished using a kiln, oven, microwave or infrared heat source. Pre-warming can also be accomplished with a batch warming oven or an infrared heat source, by use of a laser beam, or by heating the marking material before vitrification.

In one embodiment, a sealed colorant package that allows the methods of the invention to be practiced without handling various marking materials is provided. The sealed colorant package would be placed in physical contact with the substrate to be marked and irradiated. The sealed colorant package would then be removed from the surface of the substrate and discarded, or recycled. With reference to FIG. 2, the surface of the colorant carrier 36 is positioned over the surface 32 of the brick 30 with the marking enhancement materials placed on top of the foil 34. The colorant carrier 36 holding the marking material during the irradiation step, the foil 34 forming a metal oxide for use in the vitrification composition.

Figure 2A:
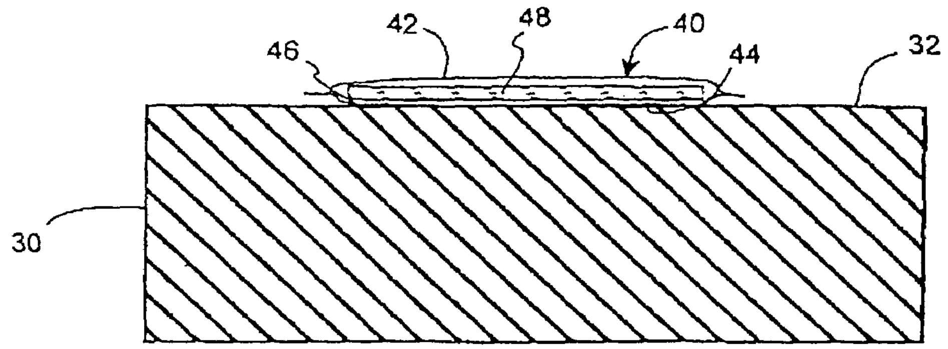
FIG. 2*a* is a cross-sectional view of the colorant carrier in a sealed package.

FIG. 2*a* is a cross-sectional side view depicting a brick 30 having a substrate surface 32 wherein the colorant carrier 40 is a sealed package having a top 42, bottom 44, and a peripheral sealed edge 46. The colorant, for example, glass frit precursors 48, is distributed within the sealed package, either homogeneously or in a predetermined distribution pattern, allowing prepackaged shipment of the colorant carrier. In this embodiment, the colorant may be admixed with a liquid, such as mineral oil to form a paste or slurry, which typically results in a staining of the surrounding area requiring a labor intensive scrubbing of the vitrified object. Failure to remove the colorant from the surrounding area can lead to an unsightly discoloration. Further, even if most of the colorant is removed, trace amounts can discolor over time due to ultra violet exposure or normal aging. In a preferred embodiment, the top and bottom sheets are made from foil and the colorant composition is sealed within the package. During the laser marking process, only the area that is used in the vitrification step is removed and the laser beam is adjusted so that the package is essentially resealed during the step. Thus, if a dry powder colorant composition is employed, exposure to such items as crystalline silica, which is a known carcinogenic, is reduced or eliminated.

In a particular embodiment of the invention, an oxygen gas assist is incorporated in the process in order to create an oxygen-enriched atmosphere on the surface of the substrate prior to vitrification. While not wishing to be bound to any particular theory, it appears that the inclusion of oxygen increases the apparent beam intensity at the interface of the focal point of the laser beam and the surface of the substrate. This apparent increase in intensity provides more depth, width and visual appeal to the finished vitrified surface without compromising the marking speed. Many methods for creating an oxygen-enriched atmosphere are known in the art. Any of those methods may be employed in accordance with the invention. One method for creating an oxygen-enriched environment involves incorporating a gas supply manifold to the surface of the substrate during laser vitrification. The inclusion of oxygen yields improvements in both marking quality and efficiency of the process, per se.

The oxygen can also be introduced to a substrate using flexible hoses and a diffuser, which flood the surface of the clay body with a continuous stream. Heating the gas prior to delivery to the work surface has also been shown to result in improved performance and efficiency.

All patents and publications mentioned in this specification are hereby incorporated by reference to the same extent as if each individual publication were specifically and individually indicated to be incorporated by reference.

It is to be understood that while certain embodiments of the invention are described and illustrated herein, the invention is not to be limited to the specific form or arrangement described and shown herein. It will be apparent to those skilled in the art that various changes may be made without departing from the scope and spirit of the invention and the invention is not to be considered limited to what is shown and described herein.

What is claimed is:

1. A method for vitrescent marking of a substrate comprising:

placing a substrate to be marked and at least one marking material in reactive contact with each other, wherein the substrate has an outer surface; and vitrifying the substrate and the at least one marking material together to form a vitrescent marking having an exposed visible vitrified surface area lower than the outer surface of the substrate;

wherein said vitrification comprises irradiating the at least one marking material and the substrate with a radiant energy beam, wherein the radiant energy beam has a wavelength and energy level sufficient to vitrify the at least one marking material and the substrate to form the vitrescent marking having the exposed visible vitrified surface area lower than the outer surface of the substrate.

2. The method of claim 1 further comprising removing the moisture from the substrate prior to vitrification.

3. The method of claim 2 comprising drying the substrate prior to vitrification.

4. The method of claim 2 further comprising heating the substrate prior to vitrification.

5. The method of claim 1 wherein the substrate to be marked and at least one marking material are placed in reactive contact with each other by brushing the marking material onto the outer surface of the substrate.

6. The method of claim 1 wherein the substrate to be marked and at least one marking material are placed in reactive contact with each other by spraying the marking material onto the outer surface of the substrate.

7. The method of claim 1 wherein the substrate to be marked and at least one marking material are placed in reactive contact with each other by dipping the substrate in the marking material.

8. The method of claim 1 wherein the substrate to be marked and at least one marking material are placed in reactive contact with each other by centrifugal force.

9. The method of claim 1 wherein the substrate to be marked and at least one marking material are placed in reactive contact with each other by gravity feed.

10. The method of claim 1 wherein said marking material comprises additional marking enhancement agents.

11. The method of claim 1 wherein said substrate is a brick.

12. The method of claim 1 wherein said step of irradiating the at least one marking material and the substrate with a radiant energy beam comprises irradiating the at least one marking material and the substrate with a laser beam.

13. The method of claim 12 wherein said laser beam is applied in a continuous wave.

14. The method of claim 12 wherein laser beam has an energy level ranging between about 40 watts and about 500 watts.

15. The method of claim 14 wherein the laser beam has an energy level ranging between about 60 watts and about 100 watts.

16. The method of claim 14 wherein the laser beam has an energy level ranging between about 60 watts and about 80 watts.

17. The method of claim 14 wherein the vitrification is accomplished in an oxygen-enriched environment.

18. The method of claim 1 wherein the radiant energy beam expansion factor is about 1.6× to about 5.0× wide.

19. The method of claim 1 wherein said at least one marking material is at least one selected from the group consisting of metal oxides, mixed metal oxides, clay, porcelain enamels, ceramic enamels, glass frits, inorganic pigments, boric oxide, borate compounds, powdered graphite, glass beads, ground glass, aluminum, chromium, cobalt, manganese, fluoride containing compounds, soluble molybdenum compounds, crystalline silica, copper, nickel, zirconium compounds, spinels, combinations and mixtures thereof.

20. The method of claim 1 wherein said step of irradiating the at least one marking material and the substrate comprises steering the radiant energy beam over the at least one marking material and the outer surface of the substrate at a rate of about 10 to about 500 millimeters per second.

21. The method of claim 12 wherein said laser beam is emitted from a Nd:Yag laser.

22. The method of claim 1 wherein said step of placing the substrate and at least one marking material in reactive contact with each other comprises applying the at least one marking material onto the outer surface of the substrate.

23. The method of claim 22 wherein the at least one marking material is in powder form.

24. The method of claim 22 wherein the at least one marking material is in paste form.

25. The method of claim 22 wherein the at least one marking material is in sheet form.

26. The method of claim 1 wherein said step of irradiating the at least one marking material and the substrate with a radiant energy beam comprises irradiating the at least one marking material and the substrate in one application of the radiant energy beam to form a vitrified marking at a depth of between about one sixty-forth of an inch and about one-eighth of an inch lower than the outer surface of the substrate.

27. The method of claim 1 wherein said at least one marking material is placed on a carrier prior to being placed in reactive contact with the substrate to be marked.

28. The method of claim 27 wherein the carrier is a metal foil.

29. The method of claim 12 wherein said laser beam is applied in a pulsed wave.

30. The method of claim 12 wherein said laser beam has a wavelength of about 1064 nanometers.

31. The method of claim 12 wherein said laser beam is emitted from a $CO_2$ laser.

32. The method of claim 1 wherein the substrate is a ceramic.

33. The method of claim 1 wherein the substrate comprises cement.

34. The method of claim 1 wherein the marking material is applied about 0.0005 inch to about 0.100 inch thick.

35. The method of claim 1 wherein the substrate comprises stone.

36. A method for vitrescent marking of a substrate with glass having a predetermined color, comprising:

placing a substrate and at least one marking material of a predetermined color in reactive contact with each other, wherein the substrate has an outer surface; and irradiating the at least one marking material and the substrate with a continuous wave laser beam having an energy level ranging between about 60 watts and about 100 watts, wherein the laser beam has a wavelength of about 1064 nanometers and is adapted to vitrify the at least one marking material and the substrate in one application of the laser beam to form a vitrescent marking comprised of colored glass having an exposed visible surface area between about one sixty-forth of an inch and about one-eighth of an inch lower than the outer surface of the substrate.

37. A method for vitrescent marking of a substrate comprising:

placing at least one marking material onto an outer surface of a brick; and vitrifying the brick and the at least one marking material to form a vitrescent marking comprising an exposed visible vitrified surface area, wherein the exposed visible vitrified surface area is positioned lower than the surface of the brick;

wherein said vitrification comprises irradiating the at least one marking material and the brick with a laser beam to achieve the desired vitrification in one application of the laser beam;

wherein said marking material is applied about 0.0005 inch to about 0.100 inch thick;

wherein said exposed visible vitrified surface area is positioned a at a depth of between about one sixty-forth of an inch and about one-eighth of an inch lower than the outer surface of the brick, wherein the laser beam has a wavelength of about 1064 nanometers, wherein the laser beam irradiates the substrate and the marking material with a continuous wave, and wherein the laser beam has an energy level ranging between about 60 watts and about 80 watts.

38. A method for vitrescent marking of a substrate comprising:

placing a substrate and at least one marking material in reactive contact with each other, wherein the substrate has an outer surface; and irradiating the at least one marking material and the substrate with a pulsed wave laser beam having an energy level ranging between about 60 watts and about 100 watts, wherein the laser beam has a wavelength of about 1064 nanometers and is adapted to vitrify the at least one marking material and the substrate to form a vitrescent marking having an exposed visible vitrified surface area at between about one sixty-forth of an inch and about one-eighth of an inch lower than the outer surface of the substrate in one application of the laser beam.

* * * * *